(12) United States Patent  
Karjoth et al.

(10) Patent No.: US 8,458,764 B2  
(45) Date of Patent: Jun. 4, 2013

(54) SERIALIZATION OF XACML POLICIES

(75) Inventors: Guenter Karjoth, Waedenswil (CH); Andreas Schade, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 12/419,445

(22) Filed: Apr. 7, 2009

(65) Prior Publication Data

US 2010/0257579 A1     Oct. 7, 2010

(51) Int. Cl.  
*G06F 17/00*     (2006.01)

(52) U.S. Cl.  
USPC .................. 726/1; 726/26; 713/168; 713/182

(58) Field of Classification Search  
USPC .......................................................... 726/1  
See application file for complete search history.

(56) References Cited

U.S. PATENT DOCUMENTS

2009/0288136 A1 *  11/2009  Chang et al. .................... 726/1

OTHER PUBLICATIONS

Kolovski "XACML Policy Analysis Using Description Logics" World Wide Web Conference 2007, pp. 1-31.*  
Alex X. Liu et al, XEngine: A Fast and Scalable XACML Policy Evaluation Engine, SIGMETRICS'08, pp. 12, Jun. 2-6, 2008, Annapolis, Maryland, Copyright 2008.

* cited by examiner

*Primary Examiner* — Shewaye Gelagay  
(74) *Attorney, Agent, or Firm* — Cantor Colburn LLP; Daniel Morris

(57) ABSTRACT

A computer implemented access control system, the system includes a database for storing a serialized version of an XACML permissions hierarchy. The system also includes a memory for storing an original version of the XACML permissions hierarchy, and an XACML serialization engine configured to convert the XACML permissions hierarchy into the serialized version, wherein the serialized version contains a listing of at least a portion of the predicates possible in the XACML permission hierarchy and the effect on each of the portion of the predicates.

5 Claims, 5 Drawing Sheets

SERIALIZATION OF XACML POLICIES

BACKGROUND

The present invention relates to computing systems access and, more specifically, to specifying access control policies of information for various applications and a computing system.

XACML stands for eXtensible Access Control Markup Language. In general, it is a declarative access control policy language implemented in XML and a processing model, describing how to interpret the policies. XACML is widely accepted as a de facto standard for specifying access control policies in computing systems. For example, XACML has become the de facto standard for specifying access control policies for various applications, especially web services. It defines both a policy language and an access control decision request/response language, both given in XML (eXtensible Markup Language). Authorizations are given as rules that express permissions and prohibitions. Rules are combined into policies and policies may be grouped to policy sets. Different combining algorithms allow the reconciliation of the results into one final access decision.

Due to its hierarchical structure XACML lends itself very well to the concise definition of sophisticated, possibly federated authorization policies. Due to the increasing complexity of access control policies used in practice, automated methods for analyzing these policies must be provided. These methods include change impact analysis, entitlement analysis, access report generation and assurance of Separation of Duty constraints. Despite language's advantages for specifying access control policies, XACML-based access control systems perform inefficiently and do not scale well when the policy base becomes larger and more complex.

The inefficiencies are largely due to the fact that for every single access request the entire hierarchy must be traversed in order to find and evaluate the matching authorization policy elements that contribute to this particular access decision. This process often involves a large number of mainly string-based comparisons. FIG. 1 shows the basic XACML hierarchy 100. The hierarchy 100 includes a policy set 102. As shown, the hierarchy contains only one policy set 102. Of course, the hierarchy 100 could include several policy sets 102. Indeed, the policy set 102 may include other policy sets within it. In general, a policy set, as the term is used herein, shall refer to a container that can hold other policies or policy sets as well as references to policies found in remote locations. Each policy set includes one or more policies 104. A policy, as the term is used herein, represents a single access control policy, expressed through a set of rules 106. Each rule 106, based on the input, produces a binary decision. For example, permit or deny.

A policy or policy set may, thus, contain multiple policies or rules, each of which may evaluate to different access control decisions. Therefore, XACML has a collection of Combining Algorithms to reconcile the decisions made by these rules. Each algorithm represents a different way of combining multiple decisions into a single result. There are Policy Combining Algorithms (used by policy set) and Rule Combining Algorithms (used by policy). An example of these is the Deny Overrides algorithm, which says that no matter what, if any evaluation returns Deny, or no evaluation permits, then the final result is also Deny. Thus, this combiner can be regarded as a logical conjunction of permits. At present, there are seven Combining Algorithms to build up increasingly complex policies supported by XACML.

A target 108 is a set of simplified conditions for a desired resource for a particular subject and a related action. These conditions use boolean functions to compare values found in a request with those included in the target. If all the conditions of a Target are satisfied, then its associated policy set 102, policy 104, or rule 106 applies to the request.

Once a policy 104 has been found and verified to apply to a given request, its rules 106 are evaluated. Rules have an effect 112 represented as a Permit or Deny that is associated with successful evaluation of the rule. Rules may also have a condition 110. If this condition 110 evaluates to true then the rules effect 112 is returned. Evaluation of a condition 110 may also result in an error (Indeterminate) or discovery that the condition 110 does not apply to the request (NotApplicable). Conditions can be quite complex, built from an arbitrary nesting of functions and attributes. Attributes are named values of known types that may include an issuer identifier or an issue date and time. Specifically, attributes are characteristics of the Subject, Resource, Action, or Environment in which the access request is made. A user's name, its security clearance, the file the user want to access, and the time of day are all attribute values. When a request is sent from a Policy Enforcement Point (PEP) to a Policy Decision Point (PDP), that request is formed almost exclusively of attributes, and their actual values will be compared to attribute values in a policy to make the access decisions.

In summary, authorizations are expressed in XACML by access rules that specify the subject, resource and action elements of an authorization. These elements may define the applicable subjects, resources, and actions specifically, or may be wildcard elements, which match all specific elements in the corresponding category. For example, a rule expressing authorization of a user "Alice" to perform the action "read" on a data object "Manuals" can be defined by (using some simplifications in the XML syntax):

```
<Rule Effect =" Permit ">
    <Target >
        <Subject " Alice ">
        <Resource " Manuals ">
        <Action " read ">
    </ Target >
</ Rule >
```

Groups of rules can be combined via combining algorithms that implement logical operations into policies, and groups of policies can be similarly combined into policy sets. Thus, the overall access control policy data structure in XACML typically comprises multiple policy sets, each specifying the combining algorithms to be applied by the decision logic to policies, and, within those policies, rules, which apply to particular combinations of subject/resource/action elements.

In operation, the decision logic compares the subject/resource/action triple in an access query to the targets in the data structure to identify the applicable policy sets, policies and rules, and then evaluates these accordingly. This evaluation yields a permit or a deny decision in response to the access request. The disadvantage of this representation is that for each request the complete XACML hierarchy must be processed in order to find the matching policy sets, polices and rules, to evaluate them and to compute the access decision result. For real-world authorization policies comprising thousands of users and millions of resources this is a time and memory consuming process.

The hierarchical nature of XACML also creates problems when analyzing authorization policies. In contrast to policy evaluation, it is not sufficient to decide that a particular subject may or may not access a particular resource but to reason why this is the case. For this reason even basic optimization strategies such as disregarding non-applicable portions of the policy cannot be deployed.

SUMMARY

According to one embodiment of the present invention, a computer implemented access control system including a database for storing a serialized version of an XACML permissions hierarchy is provided. The system also includes a memory for storing an original version of the XACML permissions hierarchy; and an XACML serialization engine configured to convert the XACML permissions hierarchy into the serialized version, wherein the serialized version contains a listing of at least a portion of the predicates possible in the XACML permission hierarchy and the effect on each of the portion of the predicates.

Another embodiment of the present invention is directed to a computer implemented method for converting an XACML specification into a serialized listing of input predicates and results. The method of this embodiment includes receiving from a memory of a computer an original XACML permissions specification; aggregating the targets in the XACML permissions specification; computing the predicates for each rule; creating a table of all of the predicates for each rule contained in each policy of the XACML specification; creating a table of all the predicates for each policy contained in each policy set in the XACML specification until the topmost predicate set is reached; and storing the final table in a database; the final table representing the serialized listing of input predicates and results.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention are directed to systems and methods for converting an XACML hierarchy into a serialized form. This may be accomplished, for example, by examining each rule and, based on other rules, performing predicate algebra upon them to create a set of rules without concealments (as well as other possible exceptions). The resultant set of rules of is then used to create serialized predicates of each policy in the XACML policy. From this, a serialized version of the policy sets may be created.

Figure 1:
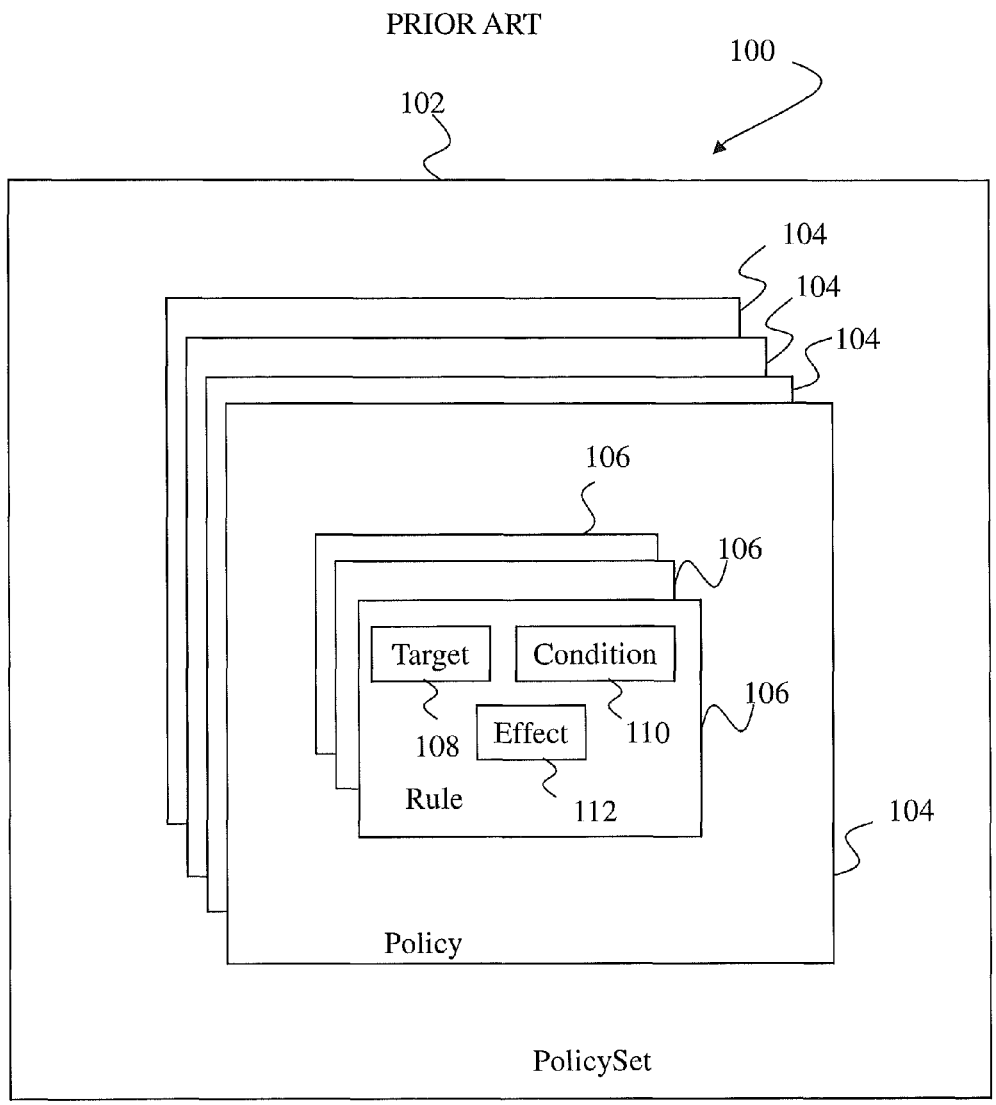
FIG. 1 shows an example of an XACML hierarchy.
Figure 2:
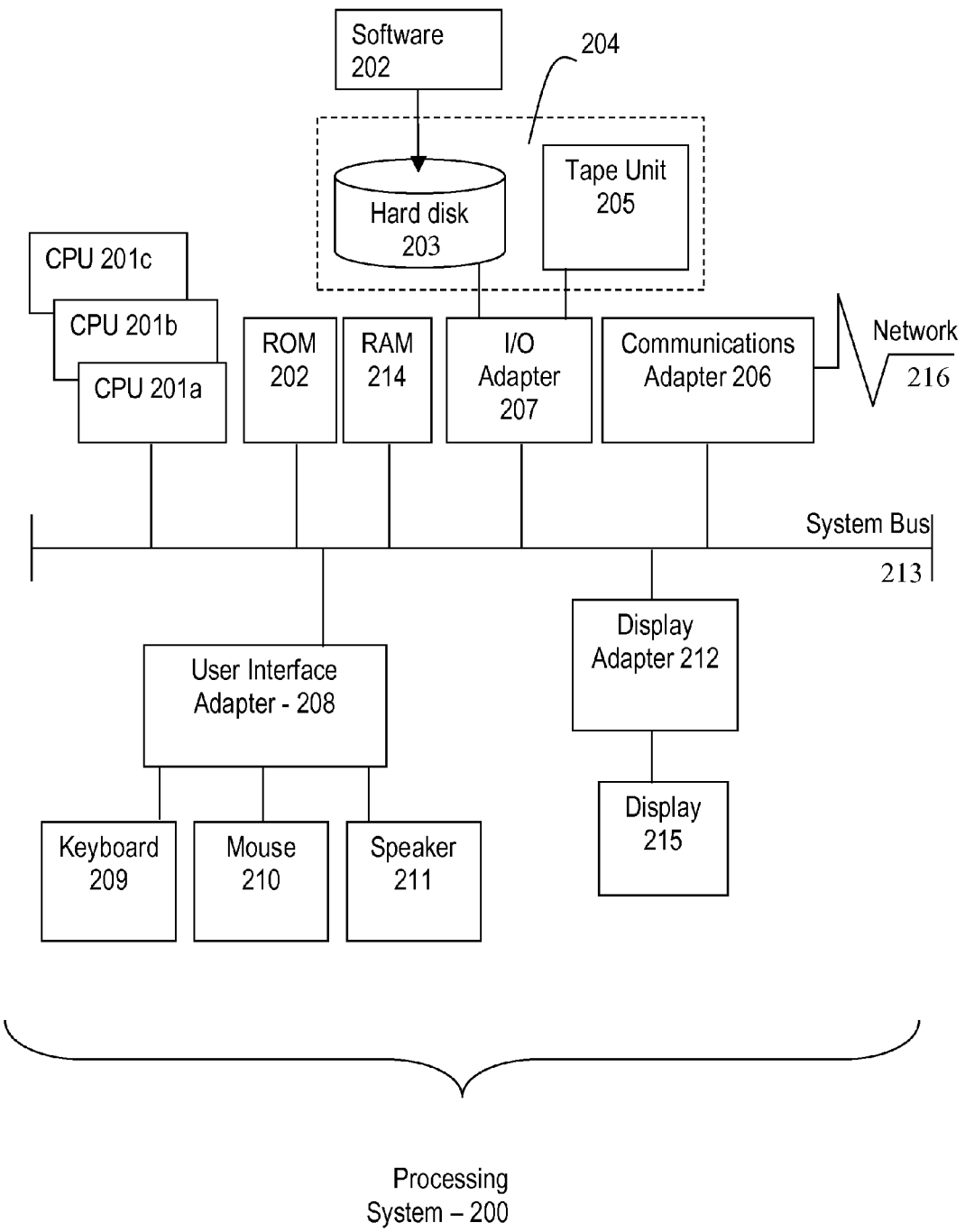
FIG. 2 shows an example of computing system on which the present invention may be implemented.

Referring to FIG. 2, there is shown an embodiment of a processing system 200 for implementing the teachings herein. In this embodiment, the system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. A network adapter 206 interconnects bus 213 with an outside network 216 enabling data processing system 200 to communicate with other such systems. A screen (e.g., a display monitor) 215 is connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 213 via user interface adapter 208 and display adapter 212. A keyboard 209, mouse 210, and speaker 211 all interconnected to bus 213 via user interface adapter 208, which may include, for example, a Super I/O chip integrating multiple device adapters into a single integrated circuit.

Thus, as configured in FIG. 2, the system 200 includes processing means in the form of processors 201, storage means including system memory 214 and mass storage 204, input means such as keyboard 209 and mouse 210, and output means including speaker 211 and display 215. In one embodiment, a portion of system memory 214 and mass storage 204 collectively store an operating system such as the AIX® operating system from IBM Corporation to coordinate the functions of the various components shown in FIG. 2.

It will be appreciated that the system 200 can be any suitable computer or computing platform, and may include a terminal, wireless device, information appliance, device, workstation, mini-computer, mainframe computer, personal digital assistant (PDA) or other computing device.

Examples of operating systems that may be supported by the system 200 include Windows 95, Windows 98, Windows NT 4.0, Windows XP, Windows 2000, Windows CE, Windows Vista, Macintosh, Java, LINUX, and UNIX, or any other suitable operating system. The system 200 also includes a network interface 206 for communicating over a network 216. The network 216 can be a local-area network (LAN), a metro-area network (MAN), or wide-area network (WAN), such as the Internet or World Wide Web.

Users of the system 200 can connect to the network through any suitable network interface 216 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 200 includes machine readable instructions stored on machine readable media (for example, the hard disk 204) for capture and interactive display of information shown on the screen 215 of a user. As discussed herein, the instructions are referred to as "software" 220. The software 220 may be produced using software development tools as are known in the art. Also discussed herein, the software 220 may also referred to as a "command line testing tool" 220, an "a testing interface" 220 or by other similar terms. The software 220 may include various tools and features for providing user interaction capabilities as are known in the art.

In some embodiments, the software 220 is provided as an overlay to another program. For example, the software 220 may be provided as an "add-in" to an application (or operating system). Note that the term "add-in" generally refers to supplemental program code as is known in the art. In such embodiments, the software 220 may replace structures or objects of the application or operating system with which it cooperates.

The software 220 generally provides users with a capability to thoroughly and automatically test commands that issue from a command line. The commands may be native to (written to function within) computer application code programs (for example, C, C++, Perl, Java and others), other programs typically regarded as computing environments (UNIX, LINUX, DOS, and others) as well as other types of programs.

Figure 3:
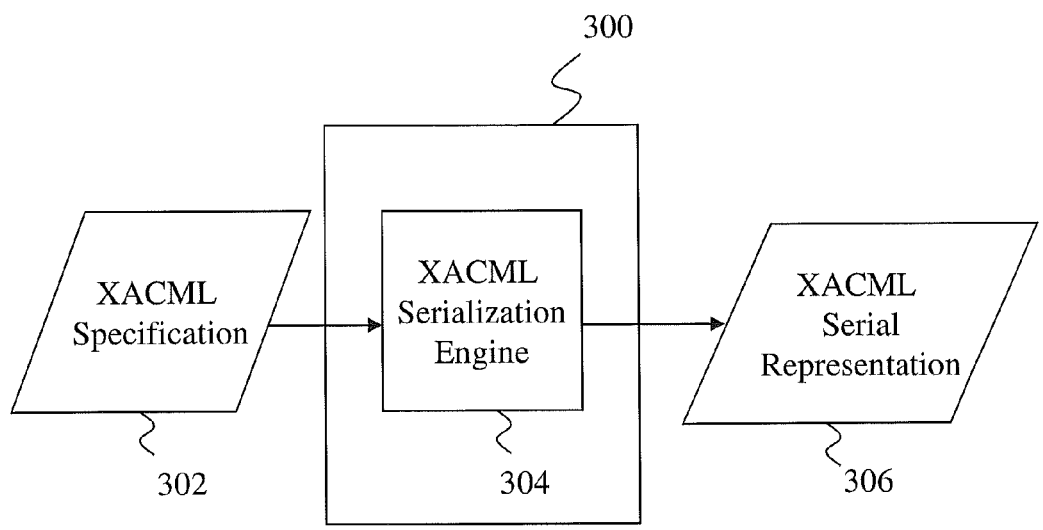
FIG. 3 shows one embodiment of a computing system according to the present invention.

FIG. 3 shows a particular implementation of computing device 300 configured according to an embodiment of the present invention. An XACML specification 302 is initially created in the standard manner. Any type of XACML specification 302 may be utilized according to embodiments of the present invention. In one embodiment, however, certain simplifying assumptions may be made about the XACML specification 302. For instance, only access conditions expressed over subjects, actions, and resources in target elements of policy sets, policies, and rules in XACML may be considered. That is, access conditions based on environment variables in target elements and condition elements within XACML rules are ignored. Further, in one embodiment, only equality relations are supported for conditions over subjects, actions, and resources. The serialization approach disclosed herein, however, could be extended to support also regular expressions. In addition, the membership of users in groups may be known at the time of the XACML serialization if access conditions are expressed using group identifiers. Also, if role identifiers are used, the assignment of users to roles is known at serialization time. In addition, in one embodiment, a request demanding access to a particular resource must be issued on behalf of a single user. This user may be member of multiple groups or act in more than one role.

The computing device 300 may include an XACML serialization engine 304. The serialization engine 304 may be configured to convert the XACML specification 302 into a serial representation 306. In one embodiment, the serial representation may be a pair of predicate sets, one containing the predicates that, if satisfied, lead to a permission of an access request, the other containing predicates leading to the denial of a request. Such a representation may advantageously allow for more simple storage, fast predicate access and access decisions, easier change impact analysis and advanced policy analysis.

As shown, XACML specification 302 and the serial representation 306 are stored in a location external to the computing device. Of course, either of both of the representations could be stored in memory in the computing device or could be stored on another computing device. In one embodiment, the serial representation 306 is stored in a database. In one embodiment, the serial specification may be stored in one predicate table identifying, for example, the user, action, and resource. In another embodiment, the serial specification may be stored as two predicate tables, a p-table (permission table) and d-table (deny table) identifying, for example, the user, action, resource and effect.

In more detail, the serialization process performed in serialization engine 302 may include producing two sets of predicates, one representing permissions (p-table) granted and another one representing prohibitions (d-table) imposed by the given XACML specification 302. In one embodiment, this serial representation 306 is a non-redundant equivalent of the original XACML specification and is suitable for storage in relational databases.

Policy evaluation and analysis can both be implemented by database queries. Since databases are optimized for efficient processing of large data quantities, this approach may accelerate the evaluation and analysis of XACML access control specifications. The serialization engine 302, in one embodiment, works on aggregated target conditions for each rule of the XACML specification. They are constructed by logically combining all target conditions from the root of the specification to the particular rule that must be satisfied for the rule to be evaluated. Depending on the rule's effect, these conditions are predicates that lead to either permission or denial of an access request. Any such predicate is a triple consisting of a user/group identifier, an action identifier, and a resource identifier. Over these predicates a concealment relation may be applied that indicates whether predicates are hidden, and three operations merge, unify, and unconcealed remainder. Predicates form an algebraic structure of a bounded lattice. Based on these definitions, predicate algebra as the theoretical foundation for the serialization algorithm may be employed. The serialization is implemented as a recursive traversal of the XACML policy tree, generating the aggregated target predicates per rule and computing the resulting serialization sets per policy or policy set. These sets of permissions and prohibitions are generated by applying suitable predicate operations depending on the rule/policy combining algorithm used in each policy or policy set. The two result sets are non-redundant since conditions that can never match any request are identified by the concealment relation and filtered out. As discussed above, such a serialized output may allow for effective policy evaluation, entitlement analysis, access reports, and fulfillment of Separation of Duty constraints.

Figure 4:
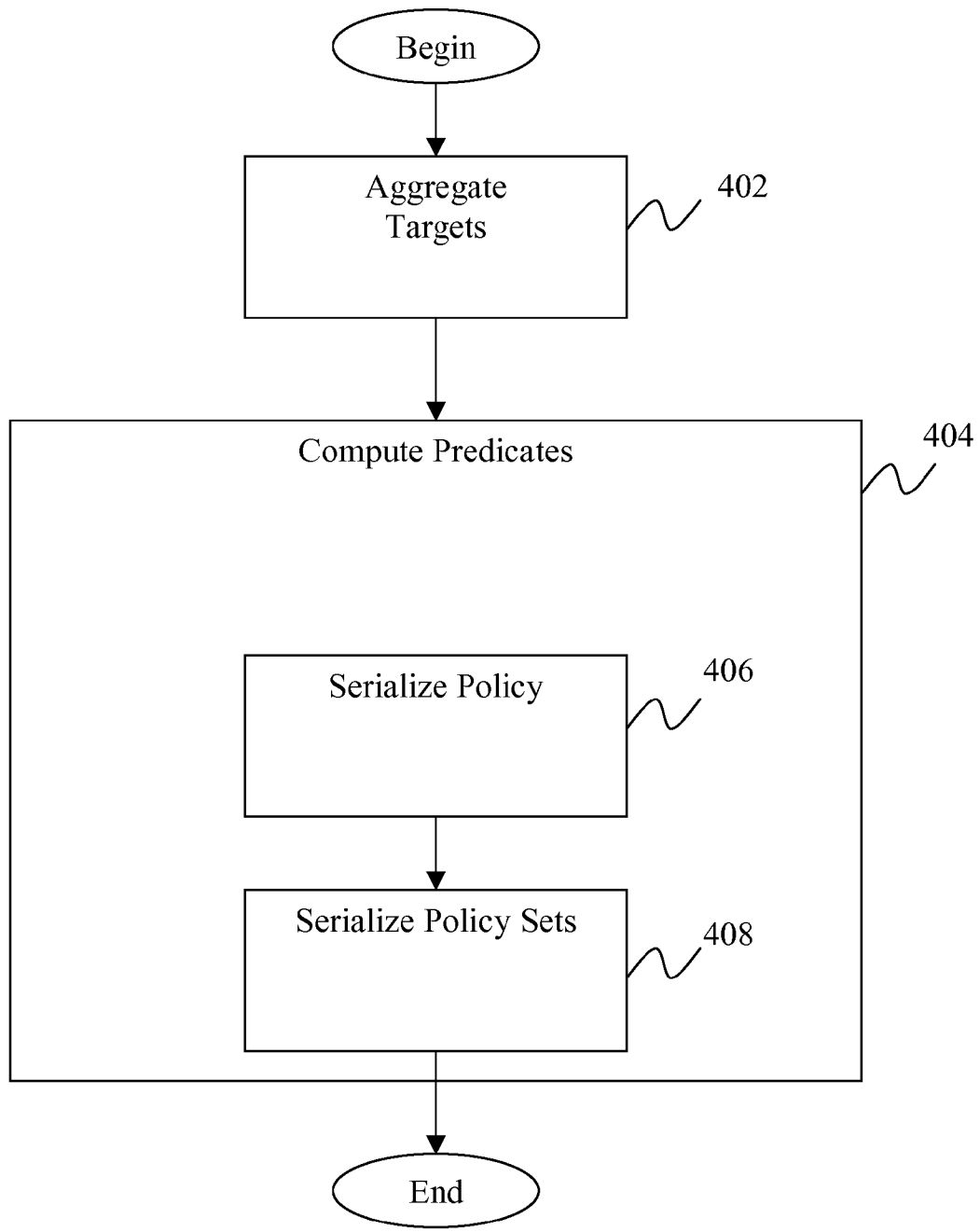
FIG. 4 shows a flow chart of a serialization method according to one embodiment of the present invention.

FIG. 4 is flow chart showing one method by which serialization of an XACML hierarchy may be completed according to an embodiment of the present invention. Of course, the steps may be performed in different orders and on different computing machines as circumstances arise.

In general, FIG. 4 shows one method by which an XACML specification may be converted into a semantically equivalent set of serial rules that only contain the effective predicates. For a greater understanding of the process, the following sections show some predicate algebra that may be employed. Of course, the invention is not limited to the use of the particular algebra or formulas shown below. Rather, they are shown by way of example only and for a greater understanding of the process shown in FIG. 4.

The set of subjects (requesters), actions (read, write, execute, or delete, etc.) and resources (files) may be represented by the letters S, A and R, respectively. Of course, each set could be extended to include the any symbol and the empty symbol. From this, the set of predicates P=S×A×R may be represented as ordered triples. Then, for each of these sets a concealment definition may be defined such that an element $e_1$ (subject, action, resource,) conceals another element $e_2$ if the element $e_1$ is the same as $e_2$ or is the any (w) symbol.

In the case of predicates, let $p_1=(s_1, a_1, r_1)$ and $p_2=(s_2, a_2, r_2)$. $p_1$ conceals $p_2$ if: $s_1$ conceals $s_2$, $a_1$ conceals $a_2$, and $r_1$ conceals $r_2$. An example of such concealment exists where the first tuple ($w_s$, read, Manuals) conceals (Alice, read, Manuals). The concealment relation is reflexive, transitive and antisymmetric and, thus, defines a partial order over P.

Similarly, for predicate sets, a predicate set X conceals a predicate x if there is predicate in X that conceals x. This relation allows for the definition of minimal predicate sets that do not contain any concealed elements. To this end, a MIN function may be employed to eliminate all elements of a predicate set that are concealed by another element of the set. From the above example, because the tuple ($w_s$, read, Manuals) conceals the tuple (Alice, read, Manuals), the second tuple will be eliminated.

The set of predicates P can be extended to a bounded lattice. In one embodiment, three operations in P may be defined that are similar to the standard set operations intersection, union and relative complement with the difference that the predicate set operations are based on the concealment relation instead of containment as in the traditional case.

The first operation (merge) is analogous to the intersection of sets. The result of the merge operation for two predicate sets P1 and P2 is the minimal set of predicates that are concealed by both P1 and P2. The second operation (unite) is analogous to a union of sets. The unite operation for two predicate sets P1 and P and P2 yields the minimal set of predicates that are concealed by P1 or P2. The third operation determines the unconcealed remainder between two sets. The unconcealed remainder of a predicate set P1 with respect to another predicate set P2 is the set of all predicates in P1 that are not concealed by P2.

Referring again to FIG. 4, assuming the above or similar definitions and operations, the serialization process begins at a block 402 where each target in the XACML hierarchy is aggregated. XACML rules are the leafs in the XACML hierarchy. For a particular rule to be applicable, its target as well as the targets of all policies and policy sets from this rule up to the root of the hierarchy have to match a given request. A policy set, policy, or rule matches a request if the condition expressed in its target element is satisfied by the request attributes. Thus, at block 402, the aggregate target for each XACML rule is computed. In one embodiment, this may be accomplished by traversing the XACML hierarchy in a depth first order and, for each rule visited, "ANDing" (computing the logical conjunction of) all targets on the path from the root to the rule. If contradicting targets are found on the path, the construction of the aggregate target fails. Such contradictions are multiple subject identities, multiple actions or multiple resources in any two target pairs. Note that multiple groups may be allowed since each group forms an "or" over all its members.

At block 404 the predicates are computed. As discussed above, the predicates represent all of the possible tuples that will cause either a permit or deny response. In one embodiment, the predicates in the serialization sets are computed in a recursive traversal of the XACML specification. The traversal may be done in depth-first order. For each rule, the aggregated target is computed during recursive descent. The aggregated targets are then used for the computation of the serialization sets. Since the traversal is done in depth-first order, the algorithm first computes the serialization sets for each policy (block 406) and then aggregates these sets into the result for the containing policy set (block 408). This process continues until the root of the XACML hierarchy is reached yielding the serialization sets for the entire specification.

In more detail, at block 406 policies are serialized into the serialization sets pset and dset, where pset contains the permissions and dset contains the prohibitions. In one embodiment, the process includes assigning empty sets to both pset and dset that act as containers. The process then iterates over the rules of the policy in the order they are specified and modifies the containers. For a particular rule this modification is driven by the policy's rule combining algorithm, the effect of the current rule, and the contents of the container computed over the predecessor rules. If the rule combining algorithm is first-applicable and the rule's effect is permit, then dset remains unchanged and pset is merged with the unconcealed remainder of the rule's aggregate target and dset. If the rule combining algorithm is first-applicable and the rule's effect is deny, then pset remains unchanged and dset is merged with the unconcealed remainder of the rule's aggregate target and pset. If the rule combining algorithm is deny-overrides or ordered-deny-overrides and the rule's effect is permit, then dset remains unchanged and the new pset is the unconcealed remainder of the old pset merged the rule's aggregate target and dset. If the rule combining algorithm is deny-overrides or ordered-deny-overrides and the rule's effect is deny, then dset is merged with the rule's aggregate target and the new pset is the unconcealed remainder of the old pset and dset. If the rule combining algorithm is permit-overrides or ordered-permit-overrides and the rule's effect is permit, then pset is merged with the rule's aggregate target and the new dset is the unconcealed remainder of the old dset and pset. If the rule combining algorithm is permit-overrides or ordered-permit-overrides and the rule's effect is deny, then pset remains unchanged and the new dset is the unconcealed remainder of the old dset merged the rule's aggregate target and pset. In another embodiment the processing order for policies using deny-overrides or permit-overrides rule combination algorithms is optimized such that the rules with overriding effect are processed before any other, which may reduce the serialization time.

Just like the policy in block 408, a policy set is also serialized into a pair of serialization sets where pset contains the permissions and dset contains the prohibitions defined by the policy set. The serialization algorithm for policy sets iterates over all members of the policy set (policies and policy sets) in the order they are specified. If it encounters a reference it tries to resolve it and to serialize its contents. The results of the serialization of the member elements are collected and aggregated into the two serialization sets according to the policy set's policy combining algorithm. In one embodiment, the process starts by assigning empty sets to both pset and dset that act as containers. For a particular policy set element the modification of the container sets is driven by the policy set's policy combining algorithm, the serialization sets of the current policy set element computed as described above, and the contents of the container computed over the predecessor policies. If the policy combining algorithm is first-applicable, then pset is unified with the unconcealed remainder of the serialized permissions of the current policy set element and the old dset, and dset is unified with the unconcealed remainder of the serialized prohibitions of the current policy set element and the old pset. If the policy combining algorithm is deny-overrides or ordered-deny-overrides, then dset is merged with the serialized prohibitions of the current policy set element, and pset is computed either as the unconcealed remainder with dset (if the serialized prohibitions of the current policy set element are empty) or by merging with the serialized permissions of the current policy set element (otherwise). If the policy combining algorithm is permit-overrides or ordered-premit-overrides, then pset is merged with the serialized permissions of the current policy set element, and dset is computed either as the unconcealed remainder with pset (if the serialized permissions of the current policy set element are empty) or by merging with the serialized prohibitions of the current policy set element (otherwise). Finally, if the policy combining algorithm is only-one-applicable, then a collision set C is constructed by merging the union of the old pset and the current permissions and the union of the old dset and the current prohibitions. Pset is the unconcealed remainder of the union of the old pset and the current permissions with said collision set C, and dset is the unconcealed remainder of the union of old dset and the current prohibitions with said collision set C.

XACML may define positive and negative effects for rules and can therefore express permissions and prohibitions. Their combination allows the definition of positive or negative authorization policies. Positive definition means that general permissions are constrained with exceptions that define particular exceptions (Everything is allowed except . . . ). Negative definition means that general prohibitions are constrained with exceptions defining particular permissions (Everything is forbidden except . . . ). As a result, permissions and prohibitions may not be completely independent but may influence each other. The idea of combined permissions and prohibitions leads to a notion of exceptions for predicates; i.e., a certain predicate holds except for a set of concealed predicates (its exceptions) that do not. Using this idea, effective permissions and prohibitions defined by an XACML specification may be represented in a closed form. The effective permissions of an XACML specification are the set of permitted predicates where each predicate is associated with a set of exceptions such that the permitted predicates conceal all exceptions. Similarly, effective prohibitions in an XACML specification are the set of prohibited predicates where each predicate is associated with a set of exceptions such that the prohibited predicate conceals all exceptions thereto. With these operations, effective permissions and prohibitions can be used to compute of more complex analysis functions.

Figure 5:
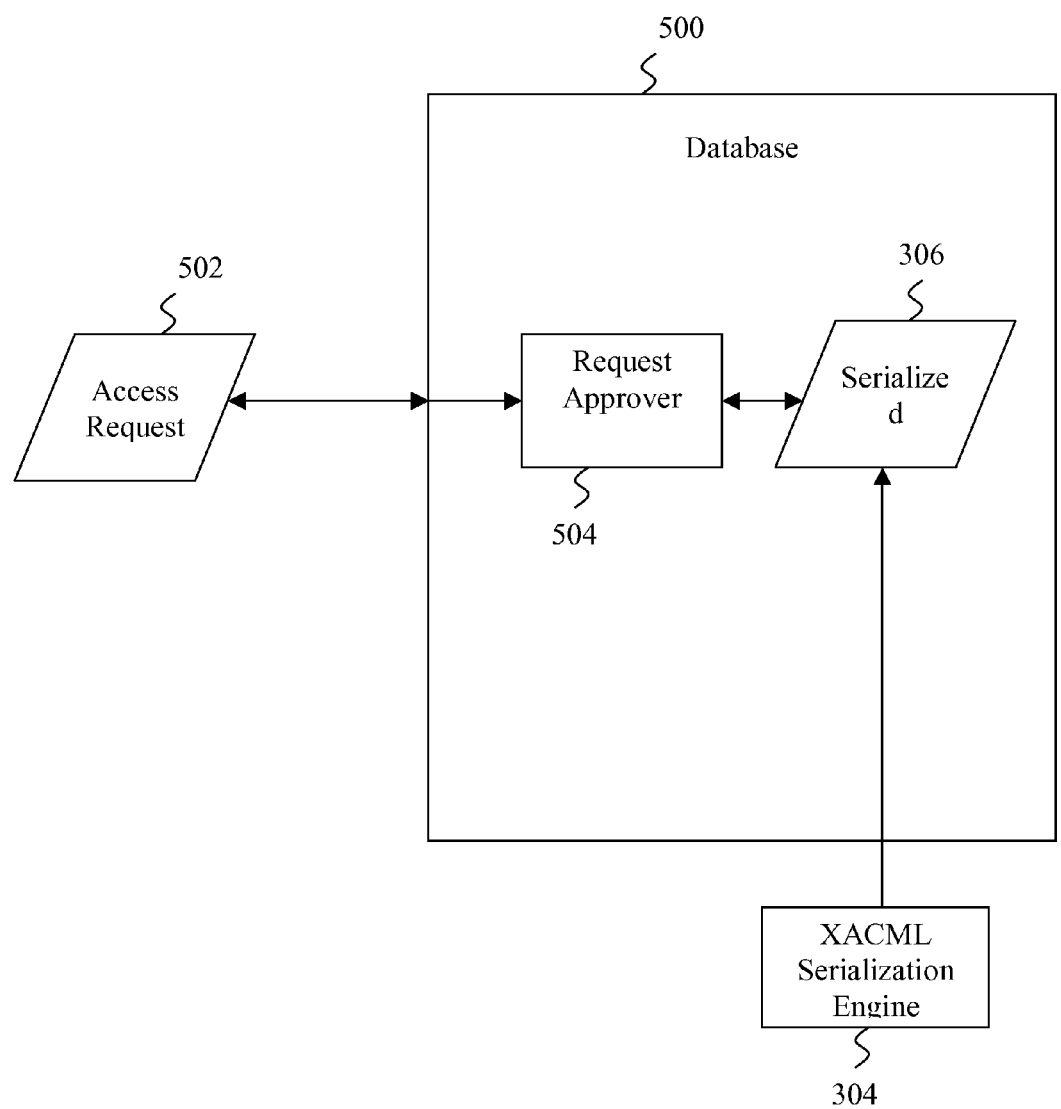
FIG. 5 shows an example of a storage and access mechanism for embodiments of the present invention.

FIG. 5 shows a database 500 that may be utilized in the present invention. The database 500 may be any type of database. The database 500 contains a serialized version 306 of the XACML hierarchy that was produced by an XACML serialization engine 304 as described above. An access or other request 502 is received by a request approver 504, which is configured to query the serialized XACML 306 to create results based on the request.

Serializing an XACML specification is an effort that has to be performed only once and the result has some powerful advantages. Immediate benefits are easy storage of and access to serialized XACML polices resulting in simpler access decision making by, for example, the request approver 504. Advanced features such as entitlement analysis (e.g., what resources can be accessed by a given user) and access reports for a given resource can be implemented relatively easy over serialized XACML specifications. Even the evaluation of complex separation of duty constraints and change impact analysis can be supported.

Databases, such as database 500 are perfectly suitable for storing large predicate sets resulting from real-world authorization policies with thousands of users and millions of resources. A serialized XACML specification 306 can be stored in a database, for example, within a predicate table with the columns subject (user identifier), action, resource, and effect. Based on the user-group assignment information user-based predicates can be folded into a group-based predicate. That is, if all members of a particular group G are associated with the same action-resource-pair (act; res), the corresponding predicates can be factored into a single predicate (G; act; res) in a table for predicates with group identifiers. Similarly, effective permissions can be stored in two tables, one for the permissions and a second one for their exceptions that are associated via unique keys.

Another advantage of the present invention is that it facilitates fast predicate access and access decisions done by the request approver 504. For example, SQL queries can be used for accessing predicates stored in a database, which simplifies the look-up of permissions and prohibitions since the look-up condition can easily be expressed over subjects, actions, and resources. Databases also lend themselves well for searching in potentially large structured data sets. Using the relational algebra notation, the following term denotes the selection of all predicates that have a particular subject s and their subsequent projection to action and resource attributes.

Predicates[Subject=s][Action;Resource]

Deciding whether a given access request is permitted or denied is a simple and straight-forward task. The request 502 forms a request predicate preq=$(s_{req}; a_{req}; r_{req})$ consisting of the subject demanding access, the action to be performed, and the resource on which this action shall be performed. The request is permitted by the request approver 504 if (a) there is a permission that conceals the request predicate and (b) there are no more specific prohibitions concealing the request predicate. Likewise, the request 502 is denied if there is a prohibition and no more specific permission concealing the request predicate. If neither condition holds the XACML access control policy is non-applicable.

Embodiments of the present invention may also allow for Change Impact Analysis. Change impact analysis is the task of discovering to what extent a given modification of an authorization policy affects the individual permissions and prohibitions associated with users and resources. To compute the change impact of a given modification of an XACML specification at a point in time two serialized versions are compared. This comparison can be exercised very efficiently using SQL except operators, which compute the relative complement over SQL relations. The result of the change impact analysis comprises four predicate sets, gains in terms of added permissions and prohibitions as well as losses in terms of removed permissions and prohibitions.

Other embodiments may allow for Advanced Policy Analysis. Using effective permission sets E+ and E− a simple query may be performed to determine whether the serialized authorization policy permits or denies a particular access request (predicate). The query is defined as an operation yielding the effective permissions that a given request produces. This request is translated into a request predicate that consists of the subject, action, and resource attribute of the request. The predicate is then used as the query condition over the stored effective permissions and prohibitions. For example, using relational algebra notation, the entitlements (as Action-Resource-pairs) of a given Subject s are computed as E+[Subject=s],[Action, Resource], the access report for a given permission (a, r) (the set of Subjects that share said permission) is computed as E+[Action=a, Resource=r][Subject], and a Separation of Duty constraint stating that no Subject can share a set of permissions $(a_k, r_k)$ is violated if the intersection of E+[Action=$a_k$, Resource=$r_k$][Subject] for all k is not empty.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to these diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented access control system, the system comprising:
   a database for storing a serialized version of an eXtensible Access Control Markup Language (XACML) permissions hierarchy;
   a memory for storing an original version of the XACML permissions hierarchy; and
   an XACML serialization engine configured to convert the XACML permissions hierarchy into the serialized version, wherein the serialized version contains a listing of at least a portion of the predicates possible in the XACML permission hierarchy and the effect on each of the portion of the predicates, and to aggregate the targets of the XACML permissions hierarchy;
   wherein each target contains a rule and aggregating the targets includes computing predicates from the rules and aggregating the predicates into a permission set and a prohibited set to create a serialized policy;
   wherein the XACML serialization engine is further configured to serialize each policy in the XACML permission hierarchy and the XACML serialization engine is configured to create a serialized policy set by combining each of the serialized policies, the serialized policy set including a first table including permissions and second table including prohibitions, the second table being separate from the first table;
   wherein aggregating the targets includes computing predicates from the rules and aggregating the predicates into a permission set and a prohibited set to create a serialized policy, and wherein creating the table includes serializing each policy in the XACML permissions specification.

2. The system of claim 1, further comprising:
   a request approval engine configured to receive an access request, examine the serialized version and generate an allow or deny reply based on the examination.

3. The system of claim 1, wherein the permissions are resource access permissions.

4. A computer implemented method for converting an original eXtensible Access Control Markup Language (XACML) specification into a serialized listing of input predicates and results, the method comprising:
   receiving from a memory of a computer the original XACML permissions specification;
   aggregating targets in the original XACML permissions specification;
   computing the predicates for each rule;
   creating a table of all of the input predicates for each rule contained in each policy of the XACML specification;
   creating a table of all the predicates for each policy contained in each policy set in the XACML specification until the top-most predicate set is reached; and
   storing a final table in a database, the final table representing the serialized listing of input predicates and results and includes a first table including permissions and second table including prohibitions, the second table being separate from the first table;
   wherein aggregating the targets includes computing predicates from the rules and aggregating the predicates into a permission set and a prohibited set to create a serialized policy, and wherein creating the table includes serializing each policy in the XACML permissions specification.

5. The method of claim 4, wherein the XACML permissions specification includes file access permissions.

* * * * *